United States Patent Office 2,907,389
Patented Oct. 6, 1959

2,907,389

RECOVERY OF OIL FROM OIL SANDS AND THE LIKE

Donald O. Hitzman, Bartlesville, Okla., assignor to Phillips Petroleum Company, a corporation of Delaware No Drawing. Application June 18, 1956
Serial No. 591,778

13 Claims. (Cl. 166—8)

This invention relates to the recovery of oil from oil bearing inorganic solids. In one aspect it relates to the release of oil from oils sands, oil shales and the like by the action of aerobic bacteria and the recovery of said oil. In a more specific aspect it relates to the use of aerobic bacteria in the hydraulic mining of oil sands and shales.

The recovery of oil from oil sands and shales is a major problem of long standing because of the close association of the oil with the sand or shale and the necessity of handling large quantities of the inorganic mineral aggregate. Processes such as destructive distillation, solvent extraction and high temperatures and high pressures and hydrogenation at high temperatures and pressures in the presence of a catalyst have been practiced to some extent but are generally regarded as unsatisfactory because of the relatively low yields obtained and the large quantities of agglomerate that must be handled and brought up to the required high temperatures. In some cases, the mineral aggregate may run as high as 75 percent or more.

It is an object of this invention to provide an improved process for the recovery of oil from oil bearing inorganic solids such as oil sands, oil shales and the like.

Another object of this invention is to provide an improved process for the recovery of oil from oil bearing inorganic solids by the use of bacteria in the presence of oxygen.

Still another object of the invention is to provide an improved process for the recovery of oil from material such as oil sands and oil shales by the use of a combination of hydraulic mining and aerobic bacteria.

These and other objects of the invention will become more readily apparent from the following detailed description and discussion.

The aforementioned objects are realized broadly by exposing oil sands and shales to the action of bacteria in the presence of oxygen. In a more specific aspect, oil bearing inorganic solids are mined by hydraulic means and washed to an aerated accumulating zone, such as a pond, wherein aerobic bacteria provide release of the oil from the solids material. The oil is then skimmed from the accumulating zone and the water, containing bacteria, is reused in the mining operation.

The invention is applicable generally to the treatment of oil bearing inorganic solids such as oil sands, oil shales, etc. Typical of oil sands and shales which can be treated are the Athabaska sands of Northern Alberta, Canada, and oil shales, such as those found in Colorado. The invention is particularly applicable to the treatment of oil sands since this material in its natural state is usually of a suitable size for hydraulic mining, slurrying and accumulation and treatment with bacteria in a pond type recovery zone. When oil shales are treated, it is necessary to provide a size reduction step before the oil is exposed to the action of the bacteria.

Bacteria suitable for use in the method of this invention include principally bacteria of the aerobic type, such as Streptomyces, species *albus*; Thiobacillus, species *thioxidans, thioparus, novellus*; Bacillus, species *subtilis, megatherium, cereus, brevis*; Nocardia, species *paraffinae, rubra*; Azotobacter, species *chroococcum, agile, indicum* and Pseudomonas, species *fluorescens, oleovoraus, striata, membranoformis*, used either singly or in mixtures.

In the presence of oxygen these bacteria, which are otherwise dormant, grow and become very active for the purpose of displacing oil from solids such as those previously mentioned.

The mechanism by which the bacteria displaces oil from solids is not clearly understood. According to one theory, the bacteria produce a metabolic product which attacks, dissolves or displaces the oil from the oil bearing inorganic solids. According to another theory, the bacteria simply acts physically to displace the oil from the solids. It is believed that the bacteria organisms grow at the oil-water interface, which also serves to facilitate release of the oil. However, regardless of the particular mechanism involved, it has been found that the bacteria in the presence of oxygen are very active and are particularly effective in displacing the oil from the solids.

Although the strict aerobic bacteria are preferred other organisms whose growth and activity are promoted by oxygen can also be used within the scope of the invention. These include the facultative organisms; namely those which also grow to a certain extent in the absence of oxygen, such as Pseudomonas, species *aeroginosa, desmolyticum, rathonas, arvilla*; Serratia *marcescens*; Achrombacter, species *liquefaciens*; Flavobacterium, species *diffusum*; Escherichia, species *coli, freundii*; Aerobacter, species *aerogenes*; Corynebacterium, species *heldvolum*; Methanomonas, species *methanica*; Vibrio, species *cyclosites*; Micrococcus, species *agilis*; Sarcina, species *lutea, littoralis*; and Acetobacter, species *aceti*.

Although any of the bacteria given can be used it is to be understood that they do not all provide equivalent results and that the preferred bacteria are those which are aerobic and in particular of the genus Thiobacillus, Bacillus, Nocardia and Pseudomonas.

In addition to the presence of oxygen, the growth and action of the bacteria used in the invention requires the presence of mineral food. Suitable foods are the well-known plant foods such as calcium and potassium salts of nitric acid, phosphoric acid and the like. A salt mixture particularly effective for the growth of bacteria is calcium sulfate, magnesium ammonium phosphate and di-potassium phosphate. Generally however the addition of a simple nitrogen compound, such as ammonium chloride, to the oil-water mixture is sufficient for growth of the bacteria.

In carrying out the process of this invention in a preferred embodiment thereof an oil containing inorganic solid material such as for example, oil sand, is mined by the hydraulic action of water, the material released thereby being slurried in the water and washed to an accumulating and settling zone, such as a pond. A selected culture of bacteria which has been placed in the pond grows in the presence of oxygen and acts to release oil from the sand. After a sufficient amount of oil is released, the sand becomes water wet and sinks to the bottom of the pond. The oil floats on the surface and is recovered, usually by a skimming operation. The air or oxygen required to promote the growth or activity of the bacteria can be supplied by several methods such as for example, by aeration of the pond, by agitation of the pond, by providing a pond having a large surface area or by a combination of any of these methods. The water which is used for mining and slurrying the oil sand can be almost any type including rainwater, soft water, hard water, salt water and even brine water. Although a continuous fresh supply of water can be utilized in the mining process, preferably water is recycled from the pond for this purpose. This water contains active bacteria which aid in loosening the oil from the oil sands during the hydraulic mining operation and further is in contact with the slurried sands during the passage of this material from the mine to the accumulating zone. As an additional advantage, the reuse of pond water aids in developing optimum conditions and particularly effective cultures of bacteria for the release of oil from the sands.

The use of the hydraulic mining technique in conjunction with the oxygen promoted bacteria is particularly advantageous. Initial contact of the water with the oil sands causes release of some oil and the agitation produced during this contact is very effective in aerating the water to aid in providing a suitable setting for growth of the bacteria. In addition, the water serves as a medium for slurrying and passing the oil sands to the accumulating pond or zone.

Separation of oil from the oil sands is carried out broadly from ambient temperature to about 110° F. Above 110° F., the activity of the bacteria is substantially slowed down. When the ambient temperature is low, such as in a cool climate or during the winter months, heat can be supplied to the system. The optimum operating temperature range is between about 80° F. and about 100° F. The operation is normally conducted at atmospheric pressure, however, superatmospheric pressure can be used if desired without injurious effects. Sunlight is not detrimental to the action of the bacteria and in some cases may be beneficial. The time required for release of oil from the oil sands is highly variable and depends on a large number of factors, including the particular bacteria used, particle size of the oil sands, degree of oil separation, bacteria concentration, temperature, oxygen availability, etc. Release of the major portion of the oil can be effected in between about 0.2 and about 200 hours and more usually between about 0.5 and about 50 hours. When operating under preferred conditions the time of separation is even less, namely between about 0.5 and about 20 hours.

The following examples are presented in illustration of a preferred embodiment of the invention.

*Example I.*—10 parts by weight of Kansas oil sand were added to 100 parts by weight of tap water and inoculated with 0.5 part by weight of soil sample containing aerobic bacteria of the genera Bacillus and Pseudomonas. The mixture was agitated in a vessel, open to the atmosphere, for seven days. After this time the contents were examined and a film of oil was found on the top of the water and on the side of the vessel. The oil sand had changed in color from black to a light brown and had settled to the bottom of the vessel. Microscopic examination showed oil droplets surrounded by bacteria organisms.

*Example II.*—Similar tests were run with two samples of oil obtained from the German Petroleum Company—Branch Works at Wietze. One sample was obtained from an oil shaft in Wietze, West Scholle from the 210 meter bed running south. The second sample was obtained in the same area at the 256 meter level at the boundary between oil sands and wet sands. Similar results to those obtained in Example I resulted from the treatment of these samples with a similar soil sample.

Having thus described the invention by providing specific examples thereof, it is to be understood that no undue restrictions or limitations are to be implied by reason thereof but that the scope of the invention is defined by the appended claims.

I claim:

1. The process for recovering oil from subdivided oil bearing inorganic solids which comprises washing said solids from a formation by the use of a high velocity stream of water whereby a slurry of solids in water is obtained, passing said slurry to an accumulating zone containing water, contacting the solids in the accumulating zone with bacteria selected from the genera aerobic and facultative in the presence of oxygen whereby oil is released from the solids and accumulates on the surface of the water and removing oil from the accumulating zone.

2. The process for recovering oil from subdivided oil bearing inorganic solids which comprise washing said solids from a formation by using a high velocity stream of water whereby a slurry of solids in water is obtained, passing said slurry to an accumulating zone containing water, contacting the solids in the accumulating zone with bacteria selected from the genera aerobic and facutative in the presence of oxygen whereby oil is released from the solids and accumulates on the surface of the water, recycling water from the accumulating zone for use in the high velocity water stream and removing oil from the accumulating zone.

3. The process for recovering oil from subdivided oil bearing inorganic solids which comprises washing said solids from a formation by use of a high velocity stream of water whereby a slurry of solids in water is obtained, passing said slurry to an accumulating zone containing water, contacting the solids in the accumulating zone with aerobic bacteria in the presence of oxygen whereby oil is released from the solids and accumulates on the surface of the water and removing oil from the accumulating zone.

4. The process of claim 3 in which oxygen is supplied to the system by providing an open accumulating zone having a large surface area.

5. The process of claim 3 in which oxygen is supplied to the system by aerating the material in the accumulating zone.

6. The process of claim 3 in which the contact of oxygen with the bacteria is obtained by agitation of the material in the accumulating zone.

7. The process for recovering oil from subdivided oil bearing inorganic solids which comprise washing said solids from a formation by using a high velocity stream of water whereby a slurry of solids in water is obtained, passing said slurry to an accumulating zone containing water, contacting the solids in the accumulating zone with aerobic bacteria in the presence of oxygen whereby oil is released from the solids and accumulates on the surface of the water, recycling water from the accumulating zone for use in the high velocity water stream and removing oil from the accumulating zone.

8. The process of claim 7 in which the oil bearing inorganic solids are oil sands.

9. The process for recovering oil from sub-divided oil bearing inorganic solids which comprises forming a slurry of said solids in water contacting said slurry with bacteria selected from the genera aerobic and facultative in the presence of oxygen, whereby oil is released from the solids, and recovering said oil as product.

10. The method of claim 9 in which the oil bearing inorganic solids are treated with bacteria in a water system which is subjected to agitation and aeration.

11. The method of claim 9 in which the bacteria are aerobic bacteria.

12. The method of claim 9 in which the bacteria are selected from the subgenera Thiobacillus, Bacillus, Nocardia and Pseudomonas.

13. The process for recovering oil from oil bearing sands which comprises forming a slurry of said sands in water contacting said slurry with aerobic bacteria in the presence of oxygen whereby oil is released from the sands and recovering said oil as product.

References Cited in the file of this patent

UNITED STATES PATENTS

| | | |
|---|---|---|
| 2,259,419 | Hefley et al. | Oct. 14, 1941 |
| 2,720,381 | Quick | Oct. 11, 1955 |
| 2,742,398 | Zobell | Apr. 17, 1956 |

OTHER REFERENCES

Uren: Petroleum Production Engineering, Development, Third Edition, McGraw-Hill, 1946, page 8.